United States Patent [19]

van der Lely

[11] 4,210,209
[45] Jul. 1, 1980

[54] AGRICULTURAL IMPLEMENT

[76] Inventor: Cornelis van der Lely, 7, Brüschenrain, Zug, Switzerland

[21] Appl. No.: 880,091

[22] Filed: Feb. 22, 1978

[30] Foreign Application Priority Data

Feb. 22, 1977 [NL] Netherlands .......................... 7701856

[51] Int. Cl.² ............................................ A01B 61/04
[52] U.S. Cl. ....................................... 172/47; 172/59; 172/103; 172/117; 172/271
[58] Field of Search ............... 172/269, 270, 271, 260, 172/261, 262, 264, 265, 117, 103, 47

[56] References Cited

U.S. PATENT DOCUMENTS

| 230,180 | 7/1880 | Franklin | 172/271 |
|---|---|---|---|
| 2,193,157 | 3/1940 | Ayo | 172/117 |
| 2,395,342 | 2/1946 | Morkoski | 172/271 |
| 2,640,404 | 6/1953 | Scholfield | 172/270 X |
| 2,747,486 | 5/1956 | Wilson | 172/261 |
| 2,747,489 | 5/1956 | Silver | 172/270 |
| 3,503,455 | 3/1970 | Oerman | 172/271 |

FOREIGN PATENT DOCUMENTS

| 1087393 | 8/1960 | Fed. Rep. of Germany | 172/271 |
|---|---|---|---|
| 28736 | 4/1957 | Finland | 172/261 |
| 86925 | 3/1966 | France | 172/271 |
| 1402882 | 5/1965 | France | 172/271 |
| 7409104 | 1/1976 | Netherlands | 172/103 |
| 1133241 | 11/1968 | United Kingdom | 172/269 |

Primary Examiner—Richard J. Johnson
Attorney, Agent, or Firm—Mason, Mason and Albright

[57] ABSTRACT

An implement is connectable to the lifting hitch of a tractor and at least one rotary tool is driven to rotate about an upwardly extending axis. The tool or a trestle frame has an overload connection that allows the tool or frame to pivot to an inoperative position upon overload. The tool can be a blade on a carrier part that is pivoted to a support part on a spoke and a shear pin interconnected to prevent such pivoting unless tripped by overload. The parts can have a discharge arrangement that ejects the sheared pin portion from a recess in one part. Upon adjustment of the tool, the pin remainder can effect reconnection. In another embodiment, the trestle frame is coupled to a three point hitch and the implement can be tripped through a pivot connection, including a strut made up of two shaft parts, one of which holds a shear pin and the other receives a pin portion near the junction of the parts. The pin element normally prevents relative pivoting of the implement relative to the tractor connection. Upon overload the strut jack-knifes to allow the entire implement to pivot relative to the trestle.

10 Claims, 11 Drawing Figures

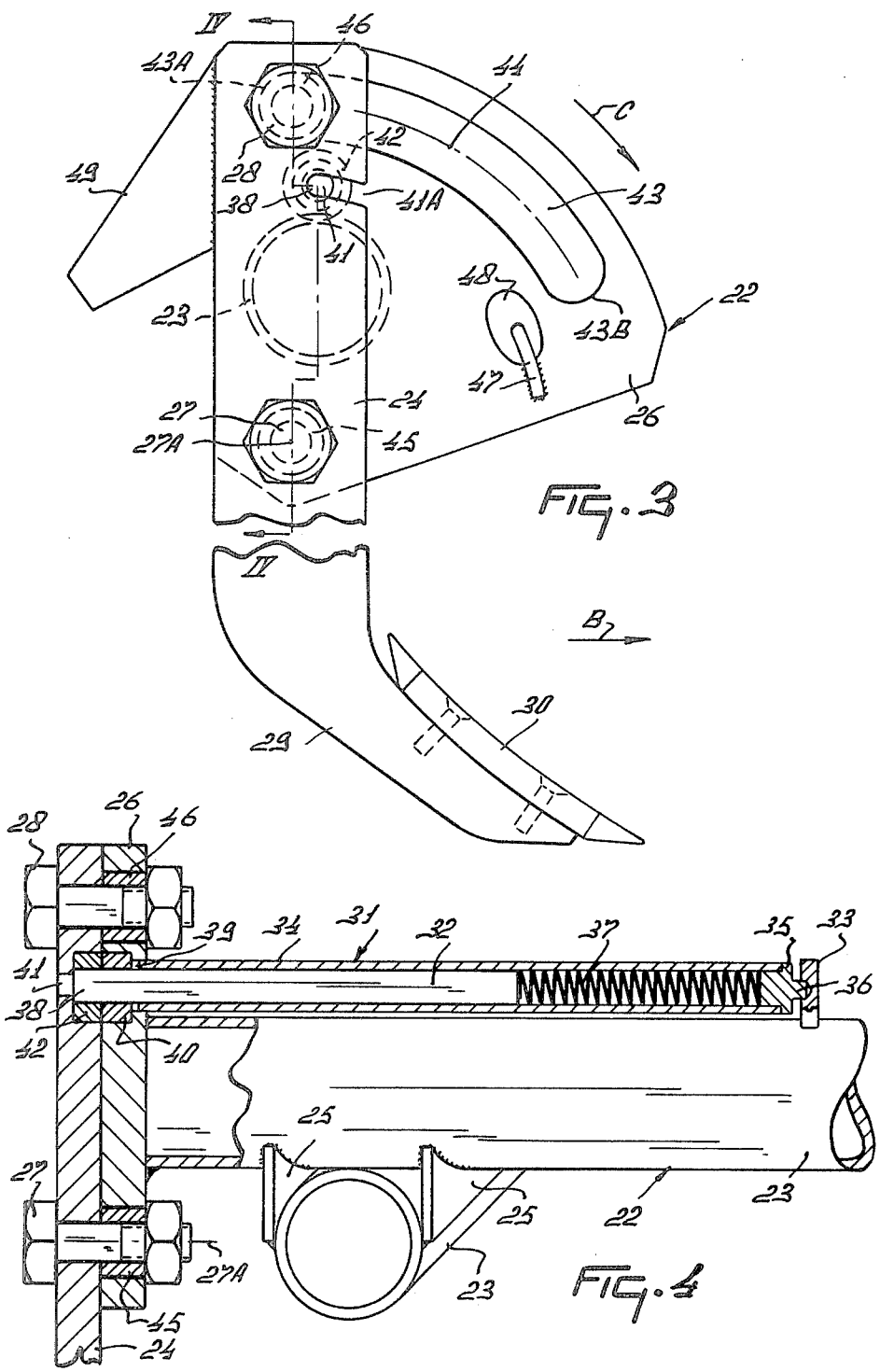

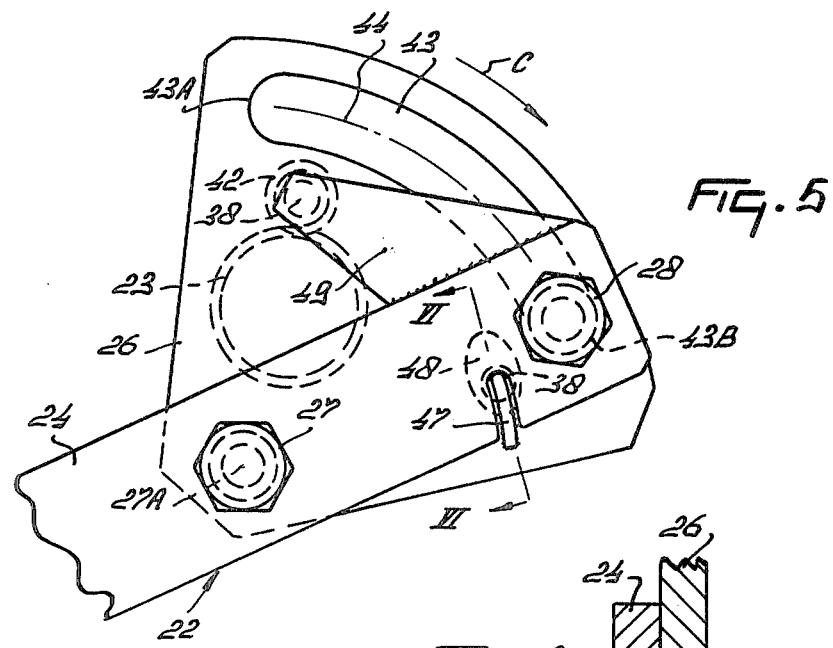
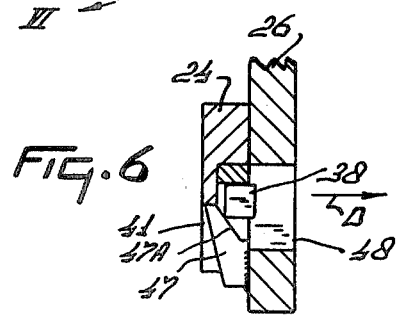
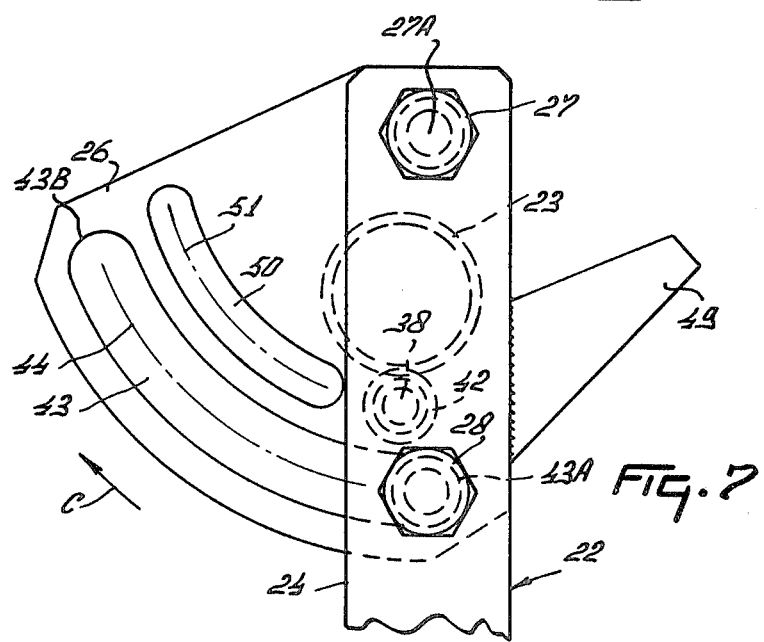

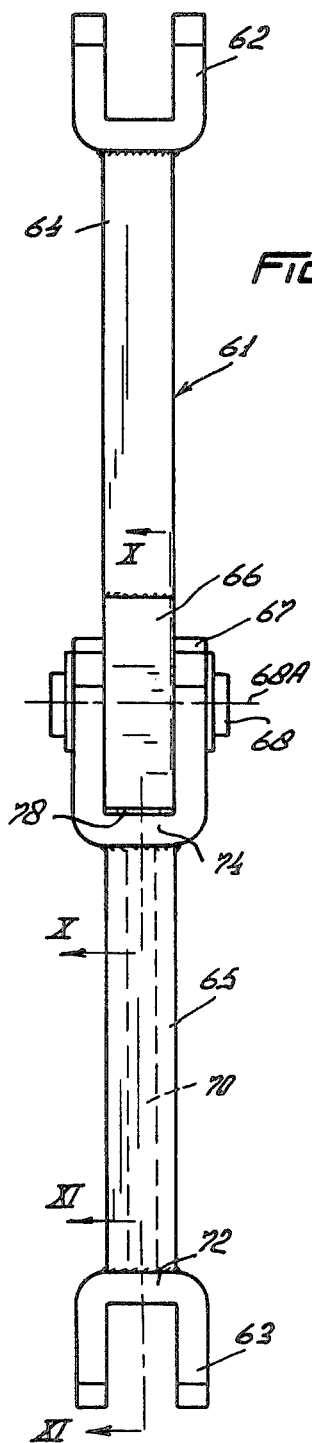
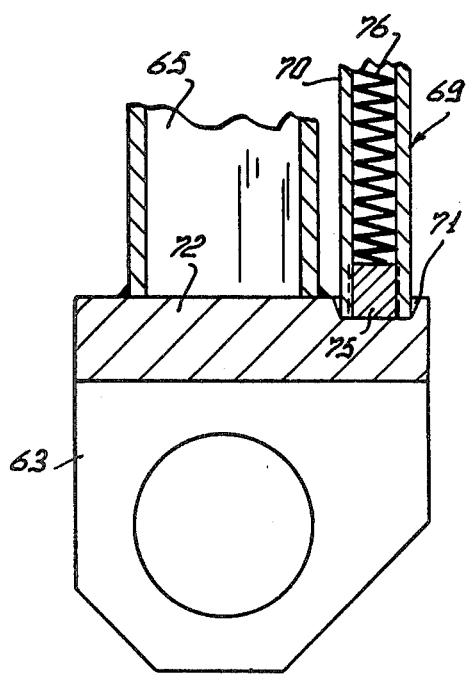
FIG. 9
FIG. 11

AGRICULTURAL IMPLEMENT

According to a first aspect of the present invention there is provided an agricultural implement having a strut comprising two parts which, in normal operation, are interconnected by coupling means for movement together in at least one direction, the coupling means being releasable upon overload of the driven part to permit limited relative pivotal movement between the two parts, advancement means being provided for re-connecting the coupling means, after release, to re-interconnect the parts.

According to a second aspect of the present invention there is provided an agricultural implement comprising two relatively movable parts and a shear pin coupling having a shear pin which, in normal operation, interconnects the two parts for movement together in at least one direction, the shear pin being connected with a first one of the parts of a strut and being located in an opening in the second one of the parts, the coupling comprising discharge means for conducting away the broken-off fragment of the shear pin after fracture upon overload.

According to a third aspect of the present invention there is provided an agricultural implement comprising a strut having two pivoted parts for connecting the implement to the lifting device of a tractor, elongated shearable pin means being provided which, in normal operation, interconnect the two parts and prevent pivotal movement between the parts, the pin means being adapted to release the strut parts, upon overload of the implement, to permit relative pivotal movement of the parts about a non-vertical axis, advancement means being provided for urging the pin in a direction transverse to that axis to re-interconnect the parts.

According to a fourth aspect of the present invention there is provided an agricultural implement with hitch means for hitching the implement to the lifting device of a tractor, coupling means being provided for interconnecting the hitch means and the remainder of the implement, the coupling means including a multiple shearable pin adapted to release the interconnection upon overload of the implement to permit relative pivotal movement between the hitch means and the remainder of the implement about a non-vertical axis, advancement means being provided for re-connecting the coupling means with the remainder of the pin to re-interconnect the hitch means and the remainder of the implement.

According to a fifth aspect of the present invention there is provided an agricultural implement having a strut comprising two pivotally interconnected arms, coupling means including a disc on one arm and the other arm has a fork pivoted to the disc and a shear pin which, in normal operation, prevent relative pivotal movement of the arms, the coupling means being adapted to "break" the two shafts for relative pivotal movement upon overload of the strut.

According to a sixth aspect of the present invention there is provided a strut suitable for connection between an agricultural implement and a tractor, the strut having two parts which are, in normal operation, fixedly interconnected by a multiple shearable pin so as to be prevented from relative movement in at least one direction, the coupling means being adapted to release the two parts for relative movement upon overload of the strut so as to allow the implement and the tractor to pivot relatively to one another.

For a better understanding of the invention and to show how it may be carried into effect, reference will now be made, by way of example, to the accompanying drawings, in which:

FIG. 3 is an enlarged view taken in the direction of the arrow III in FIG. 2;

FIG. 4 is a view taken on the line IV—IV in FIG. 3;

FIG. 5 is a view similar to that of FIG. 2, the implement being illustrated subsequent to overload;

FIG. 6 is a sectional view taken on the lines VI—VI in FIG. 5;

FIG. 7 shows an alternative embodiment of the construction shown in FIG. 3;

FIG. 9 is an enlarged elevational view taken in the direction of the arrow IX in FIG. 8;

FIG. 11 is an enlarged sectional view taken on the line XI—XI in FIG. 9.

Figure 1:
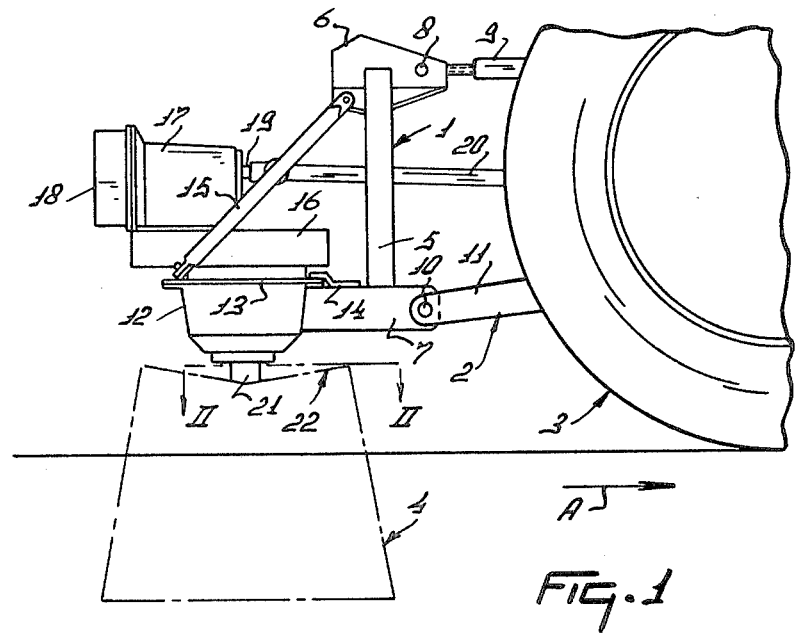
FIG. 1 is a side elevation of an agricultural implement attached to a tractor and including an overload coupling.

The construction shown in the Figures is that of an agricultural implement adapted to be attached by means of an intermediate frame 1 to the three-point lifting device 2 of an agricultural tractor 3. The agricultural implement, as shown schematically in FIG. 1, is in this embodiment a soil cultivating machine 4. It should, however, be emphasised that the construction according to the invention is applicable not only to the soil cultivating machine shown or to agricultural machinery in general, but can be used in other machines as well.

At the front of the intermediate frame 1 there is a trestle 5 having upwardly extending plates 6 at the top and supporting strips 7 at the bottom. The plates 6 are provided at the front side, viewed in the intended direction of operative travel A, with a bore receiving a pin 8, which connects the trestle 5 with a top rod 9 of the three-point lifting device 2. In a similar manner each supporting strip 7 has a bore receiving a pin 10 to attach the trestl 5 and hence the intermediate frame 1 and the machine 4 to lower arms 11 of the three-point lifting device 2.

The rear end portions of the supporting strips 7 are fastened to a gear box 12, which is closed at the top by a cover 13. Near the cover 13 each strip 7 is provided with a supporting plate 14. On the lower side of the plates 6, behind the trestle 2, are two struts 15 which diverge downwardly and are secured at their ends to the rear side of the gear box 12. Near the center of the gear box 12 is a gear box 16, above which a gear box 17 is provided. The gear box 17 is provided on its rear side with a change-speed gear 18. The pinions in the gear box 17 are drivably in mesh with a driving shaft 19 located at the front of the gear box 17 and extending in the direction of travel A. From FIG. 1 it will be appreciated that the driving shaft 19 is coupled by an auxiliary shaft 20 with the power take-off shaft of the tractor 3.

Figure 2:
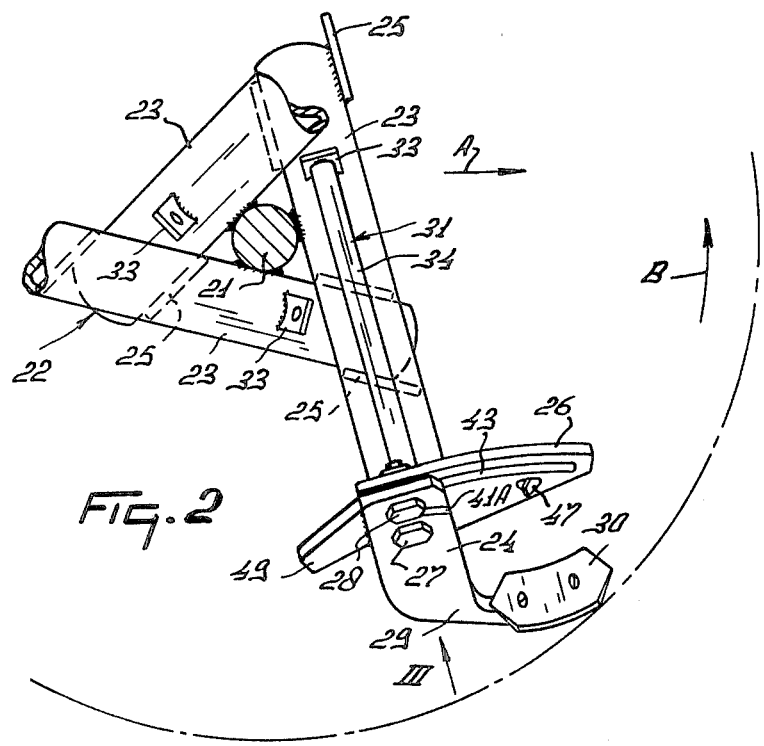
FIG. 2 is an enlarged view taken on the lines II—II in FIG. 1.

Beneath the hollow gear box 12 extending transversely of the direction of movement A are a plurality of shafts 21 which project downwardly for a short distance. Each shaft 21 is provided at its lower end with a rotor 22. Each rotor 22 is made up of three tubular spokes 23 which are each disposed substantially tangentially of the shaft 21. The spokes 23 are connected near the outer circumference of the rotor 22 with downwardly extending carriers 24 (FIG. 2). The spokes 23 are welded to the shaft 21 and, viewed on plan, their sides near the shaft 21 form an isosceles triangle (see FIG. 2). The longitudinal center lines of the spokes 23 cross one another so that each spoke 23 extends radially outwardly and upwardly from the portion engaging the shaft 21. The spokes are preferably at an angle of about 75° to 80° to tha axis of the shaft 21 (see FIG. 1). In the triangular part of the rotors 22 each spoke is connected with the neighbouring spoke by means of two parallel strips 25 (FIG. 4). To the outermost end of each spoke 23 is welded a support 26. Each support 26 is perpendicular to the longitudinal center line of its spoke 23. The carriers 24 are secured to the supports 26 by a lower bolt 27 and an upper bolt 28. The carriers 24 comprise strips and their width extends substantially tangentially. Near the bottom, each carrier 24 curves towards the front, viewed in the direction of operative rotation B of the respective rotor (FIG. 2) and extends substantially tangentially with respect to the rotary axis of the shaft 21. The bent-over end 29 of each carrier 24 has an operative tip in the form of a blade 30 terminating in a tip at the front and having a slightly curved, operative surface joining the curved end 29. The blade 30 is elongate and has a width such that the end 29 of the carrier 24 is located within the circle described by the outermost end of the blade (FIG. 2). Owing to this disposition of a spoke 23 the longitudinal center line of the carrier 24 crosses the rotary axis of the shaft 21 at an angle of about 10° to 15°, while a tangential line to the ascending rear side of the blade 30 is at an angle of about 45° to the horizontal (FIG. 3). Apart from the connection of the carrier 24 by the bolts 27 and 28 a shear pin unit 31 is provided for establishing a firm connection of the support 26, constituting a first coupling member, with the carrier 24, constituting a second coupling member, by means of a shear pin 32. These parts together constitute a shear pin coupling. An end portion of the shear pin unit 31 is in engagement with a tag 33 located, viewed on plan as in FIG. 2, near the joint between the associated spoke 23 with the spoke 23 furthes remote from the carrier 24. The shear pin unit 31 comprises a holder 34 having a generally cylindrical shape and provided with a closing cap 35 at the end remote from the coupling member 26. The cap 35 has a lug 36 fitting in a recess in the tag 33 for fastening the shear pin unit 31 to the spoke 23. The closing cap 35 is engaged by a helical compression spring 37, which urges the shear pin 32 towards the carrier 24. The shear pin 32 has, when new, a length of about 20 to 30 cms. The holder 34 is located in an opening 39 in the support 26 (FIG. 4). The opening 39 allows the shear pin unit 31 to be inserted in a simple and ready manner by pushing the holder 34 towards the carrier 24 and by locating the lug 36 in the tag 33. The spring 37, in urging the pin 32 and the holder 34 apart, constitutes a quick-action connection for fastening the shear pin unit 31 to the spoke 23. The opening 39 has a wider part facing the carrier 34, this wider part receiving a sleeve 40 of hardened material. In a similar manner an opening 41 in the carrier 24 has a wider part facing the support 26, a sleeve 42 being arranged in this wider part. This sleeve 42 is also made from hardened material. The two sleeves 40 and 42 have an inner diameter at least substantially corresponding with the diameter of the shear pin 32. For the implement part shown, the diameter of the shear pin is preferably about 14 mms. As a matter or course, the shear pin 32 may have other diameters for matching other parts of an implement or other machines. The shear pin unit 31 is disposed so that the shear pin 32 is parallel to the longitudinal center line of the tubular spoke 23, the shear pin 32 being perpendicular to the plane of the two coupling members 24 and 26.

As is shown in FIG. 3, the supporting plate 26 has a substantially triangular shape in a radial view. The support 26 has a slot 43, the longitudinal center line 44 of which is arcuate having its center located on the center line 27A of the bolts 27. The line 44 covers an arc of preferably about 60°. In this way the carrier 24 is capable of turning about the center line 27A through an arc of about 60° (see also FIG. 5). This turn is facilitated by the movability of the bolts 27 and 28 with respect to the support 26 with the aid of sleeves 45 and 46 respectively. The sleeve 46 around the bolt 28 is located in the slot 43 and has a small amount of clearance with respect to the edges of the slot. The ends 43A and 43B of the slot 43 constitute first and second stops respectively for the carrier 24. An arcuate slot 41A extends from the opening 41 in the direction of the arrow C in FIG. 3. The slot 41A covers approximately half the axial dimension of the sleeve 42 in the direction towards the support 26. The support 26 is furthermore provided with a discharge lug 47, which is disposed so that, when the carrier 24 has turned in the direction of the arrow C, the discharge lug 47 is received in the slot 41A. The discharge lug 47 preferably comprises a strip and is welded by an end portion to the support 26 and extends substantially parallel to the longitudinal center line 44 over a given distance in a direction opposite the arrow C. As shown in the elevational view of FIG. 3 the support 26 has furthermore a substantially elliptical aperture 48 beneath the end of the discharge lug 47 facing the carrier 24. With respect to the direction of the arrow C, the rear side of the carrier 24 is provided with a guide member formed by an ear 49 extending for some distance in a direction opposite the arrow C.

During operation, the machine is attached by means of the trestle 5 and the pins 8 and 10 to the three-point lifting device 2 of the tractor 3 and occupies the position shown in FIG. 1. The machine is moved in the direction of the arrow A. Through the transmission comprising the auxiliary shaft 20, the driving shaft 19, the gear box 17, the change-speed gear 18, the gear box 16 and the gear box 12 the rotors 22 are driven so that adjacent rotors 22 rotate in opposite senses with a speed of at least 40 and preferably 43 to 45 rev/min.

During the rotation of the rotors 22 the operative ends including the blades 30 pass through the soil and tear up the soil to a depth of more than 25 cms and since the carriers 24 for the respective blades 30 are bent over inwardly directly behind the blades the sides of the carrier are prevented from puddling the soil still to be worked. Owing to the angle between the spokes 23 and the rotor shaft 21 and to the perpendicular connection of the spokes 23 with the carriers 24, the carriers 24 extend outwardly away from their fastening point so that in conjunction with the bend a passage is formed behind the blade 30 on the inner side of the carrier 24 so that the earth loosened by the blades can readily escape to the rear. Since the length of the carrier 24 with the blade 30 is at least 50 cms., the potential working depth may be at least 40 cms.

Using the machine described above the soil can be worked to a great depth, however, without the need for using an extremely heavy tractor, since a large part of the power supplied by the tractor is, in this construction, available for working the soil, whereas only a small part is required to move the machine across the ground.

If during the passage of the rotors 22 across the soil a stone or the like beneath the ground surface obstructs a blade 30, the carrier 24 and the blade 30 secured thereto may turn about the pivotal axis 27A in the direction of the arrow C, which implies that the portion of the carrier 24 located beneath the pivotal axis 27A turns rearwardly and upwardly, with respect to the direction of rotation B of the rotor 22. This turn can only take place after the shear pin portion surrounded by the sleeve 42 has broken off due to overload. The sleeves 40 and 42 provide a sharply defined fracture face between the two portions of the shear pin. After the fracture of the shear pin its remaining portion stays in place in the holder 34, since the free end of the shear pin is supported by the ear 49 (FIG. 5). During the turn the bolt 28 co-operating with the slot 43 ensures that the deflection of the carrier 24 can take place only over a predetermined distance, while a relative movement of the two coupling members in a direction parallel to the longitudinal center line of the spoke 23 is practically entirely excluded. The stop 43B determines the maximum extent of the turn of the carrier 24. As stated above, the angle of deflection is about 60° so that with the depth setting shown in FIG. 1 the carrier with the blade fastened thereto can deflect at least substantially up to the ground surface and thus can pass by the obstacle, for example, a stone. The location of the stop 43B is preferably chosen so that the free end of the lug 47 is located in the opening 41 (FIGS. 5 and 6). Since the lug 47 has an upwardly inclined ramp face 47A, which comes into contact with the broken fragment 38 of the shear pin located in the sleeve 42 during the last part of the turn in the direction of the arrow C, the shear pin fragment 38 (FIG. 6) is ejected from the sleeve 42 in the direction of the arrow D, the shear pin fragment 38 being thus removed through the aperture 48. Since the rotor 22 is rotating during the overload, the turn about the pivotal axis 27A will take place with a comparatively high speed so that the ramp face 47A exerts a comparatively heavy impact on the shear pin fragment 38.

The carrier 24 is made to perform a reverse movement opposite the arrow C, by raising the agricultural machine with its rotating rotors 22 by at least a small distance by means of the lifting device 2. This lift causes the shaft 21 to assume an inclined position, which has a favourable effect on the location of the center of gravity of the carrier 24. Owing to the turn, the bolt 28 comes into contact with the stop 43A and in this position of the carrier 24 the shear pin 32 is again opposite the opening bounded by the sleeve 42, and so the shear pin 32 is pressed towards the carrier 24 by the spring 37. In this way the shear pin establishes a new connecting position, in which the two coupling members are reconnected so as not to be movable with respect to one another. It is not absolutely necessarry to lift the rotors 22; under some conditions it may be sufficient only to reduce the speed of rotation of the rotors 22. Since the shear pin 32 can break off many times in succession, the shear pin unit 31 will re-connect after overloads a great many times in succession. The shear pin 32 can be used about 15 to 20 times in succession, but it will be appreciated that this number may be raised by using a longer shear pin. Since the shear pin unit 31 can be readily replaced by means of the quick-action connection, renewal can be readily performed. The position of the shear pin unit 31 on the top side of a spoke 23 provides a satisfactory protection of the unit against dirt and mechanical damage.

It should be noted that the re-usable shear pin coupling in the construction described above may also be employed advantageously in all other agricultural implements comprising pivotable working members. Constructions embodying the invention are also very useful in non-driven parts of implements. As stated above the idea of the invention can be applied not only to the soil cultivating machine shown but also to other agricultural machines such as hay-making machines and harvesters and to non-agricultural machinery.

FIG. 7 shows a variant of the construction described above. After overload the bolt 28 can again turn in the slot 43 up to the stop 43B. In this embodiment the elliptical aperture 48 is replaced by an elongate aperture or slot 50 having its longitudinal center line extending parallel to the longitudinal line 44 and concentric with the pivotal axis 27A. Viewed in the direction of the arrow C (see elevational view in FIG. 7) the slot 50 preferably extends to a position beyond the radial line between the stop 43B and the pivotal axis 27A. Upon overload, the carrier 24 turns in the direction of the arrow C and after a short time the broken-off fragment 38 of the shear pin in the carrier 24 can snap out of the surrounding sleeve 43 through the slot 50. This movement of the shear pin fragment 38 is performed under the action of the collision of the bolt 28 with the stop 43B and the simultaneous rotation of the rotor 22. In this way the stop 43B and the opening 50 constitute means for removal of the broken shear pin fragment 38 from the sleeve 42.

Figure 8:
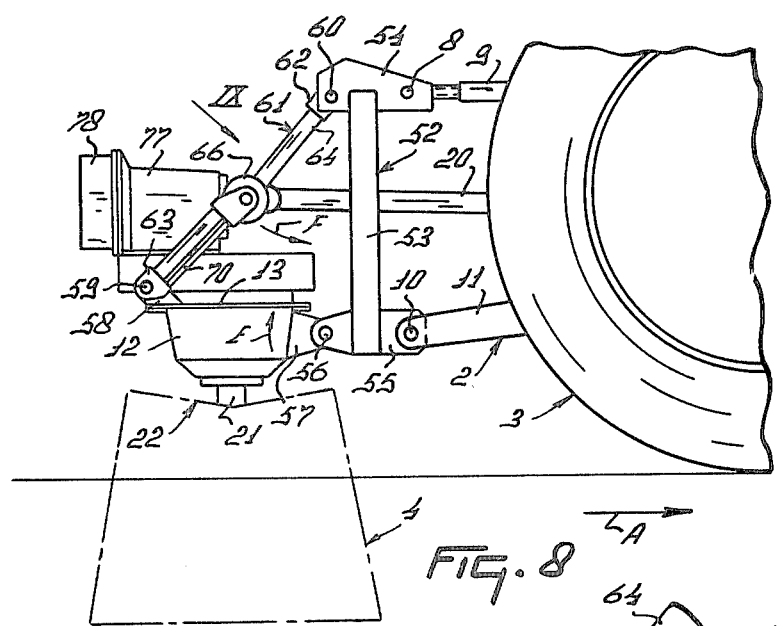
FIG. 8 is a side elevation of an agricultural implement attached to a tractor and including a further embodiment of overload coupling.
Figure 10:
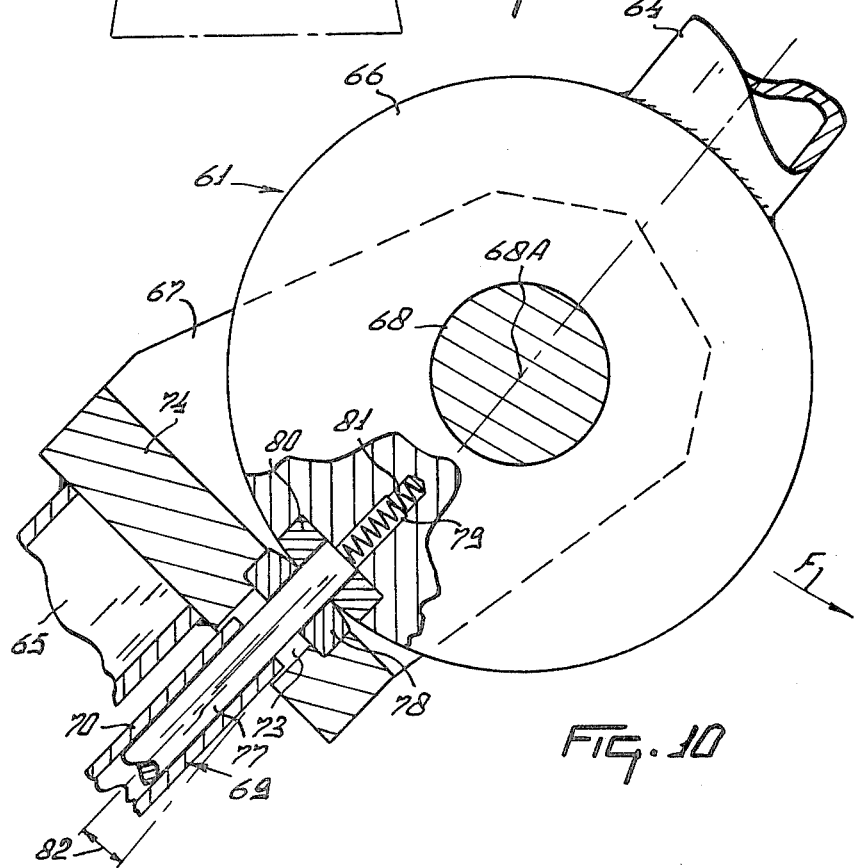
FIG. 10 is an enlarged view taken on the line X—X in FIG. 9.

FIGS. 8 to 11 show the agricultural implement of the preceding Figures attached to an intermediate frame 52, which can be fastened with the aid of a trestle 53 by means of plates 54 to the top side and by means of supporting strips 55 on the lower side of the three-point lifting device. (FIG. 8). Behind the trestle 53 the supporting strips 55 have each a bore receiving a horizontal pivotal shaft 56 extending substantially transversely of the intended direction of travel A. This pivotal shaft 56 is connected with ears 57 fastened to the front of the gear box 12. The top side of the cover 13 is provided with two parallel tags 58, through which is passed a pin 59, the center line 9 of which is parallel to that of the pivotal shaft 56. Near the lower side, behind the trestle 53, a pivotal shaft 60 is arranged in a similar manner in the plates 54. A strut 61 is arranged between the pivotal shafts 59 and 60. The strut 61 is connected by means of a fork 62 with the pivotal shaft 60 and by means of a fork 63 with the pivotal shaft 59. The strut 61 comprises two tubular portions 64 and 65 of substantially equal length, the tubular portion 64 having fastened at the end remote from the fork 62 to a circular disc 66. The tubular portion 65 is fastened at the end remote from the fork 63 to a fork 67, the two limbs of which have a bore for passing a pin 68, which extends through a bore in the disc 66. The pin 68 constitutes a pivotal axis 68A, about which the tubular portions 64 and 65 are relatively pivotable. In normal operation the fork 67 and the disc 66 forming first and second coupling members respectively are rigidly interconnected by a shear pin unit 69, these parts forming together a shear pin coupling. The shear pin unit 69 comprises a holder 70, whose end remote from the disc 66 is located in a cavity in the web 71 of the fork 63 (see FIG. 11). By its end remote from the portion 72 the holder 70 is located in an opening 73 in the web 74 of the fork 67 (FIG. 10). Near the web 72 the holder 70 is closed by a cap 75, which supports one end of a helical compression spring 76. The other end of the compression spring 76 is in engagement with a shear pin 77 having in this embodiment a diameter of about 7 mms, but it will be appreciated that the shear pin could have a different diameter in accordance with the desired maximum permissible torque. The length of the shear pin 77 when new is about 14 cms. The shear pin 77 is urged by the spring 76 in the direction towards the disc 66. The shear pin is guided in the web 74 by a sleeve 78 of hardened material, which is arranged in a widened part of the opening 73. The sleeve 78 has a slightly convex surface on the side facing the disc 66. The shear pin 77 is located, in normal operation, in an opening 79 in the disc 66, the center line of this opening being substantially radial to the pivotal axis 68A. A widened part of the opening 79 receives a sleeve 80 of hardened material, whose side facing the web 72 has a convex shape matching the periphery of the disc 66. The opening 79 also has a narrowed part extending in the direction of the pivotal shaft 68 for receiving a helical compression spring 81, which exerts a pressure on the shear pin 99 in a direction opposite the direction of pressure of the spring 76. The spring 81 has, however, a low spring force compared with that of the spring 76.

The construction illustrated in FIGS. 8 to 11 operates as follows.

By means of the auxiliary shaft 20 and the transmission between the rotors 22 and the auxiliary shaft the rotors are driven. This machine may be a soil cultivating machine as shown in the preceding Figures. Like in these embodiments the intermediate frame 52 may form the suspension gear for the three-point lifting device 2 for any type of implement in this field. When the operative parts or other parts of the implement strike an obstacle likely to cause overload, the shear pin unit 69 in the strut 61 can function as an overload safety device. As a result of the overload the portion of the shear pin 77 located in the sleeve 80 will break off. For the effect of the shear pin coupling it is important for the longitudinal center lines of the tubular portions 64 and 65 to be inclined to one another by an acute angle 82, the center lines being located on that side of a plane going through the pivotal shafts 59 and 60 which faces the pivot 56. In this embodiment the angle 82 is about 5°, but depending upon the construction of the agricultural implement and on its function the angle 82 may be larger, and it may also be advantageous to arrange the center lines of the tubular portions 64 and 65 on the other side of the plane going through the pivotal shafts 59 and 60. Turning of the implement in the direction of the arrow E about the pivot 56 results in the portions 64 and 65 turning relatively to one another about the pivotal axis 68A, which will move in a direction indicated by the arrow F in FIG. 8. Thus the angle between the two center lines of the portions 64 and 65 increases until, after the overload, a state of equilibrium is established. This may mean that the rotors 22 have risen to above the ground surface, but they may only have turned upwardly only over a small distance in the direction of the arrow E. From this deflected position the rotors may move back in the direction opposite the arrow E, while owing to the movement about the pivotal axis 68A a new portion of the shear pin enters the opening 79. During the reciprocatory movement of the two tubular portions the shear pin fragment is ejected from the opening 79 by the compression spring 81. The return movement of the pivotal axis 68A in the direction opposite the arrow F can be produced by intentionally lifting the lifting device 2. However, it is not necessary under all conditions to perform that operation on purpose, since when the lifting device is set in a floating position, a movement may be produced in the lifting device as a result of which the shear pin 77 gets into a new connecting position.

A third possibility of re-establishing the connection between the two coupling members is to drive the tractor in reverse, i.e. in the direction opposite the arrow A. Thus a movement opposite the arrow F will occur, as a result of which the shear pin is capable of entering the opening 79. The shear pin has a length such that it can re-establish the connection between the coupling halves subsequent or fracture a great many times in succession.

It should be noted that in dependence on the forces exerted on the implement it may be important to additionally reinforce the strut 61 and the portion 64 and 65 in order to avoid undesirable bending effects in the event of overload.

While various features of the agricultural machine and the overload coupling that have been described, and that are illustrated in the drawings, will be set forth in the following claims as inventive features, it is to be noted that the invention is not necessarily limited to these features and that is encompasses all of the features that have been described both individually and in various combinations.

What we claim is:

1. An agricultural implement attachment comprising frame means, coupling means on said frame means connectable to the three point hitch of a tractor, said coupling means comprising an upwardly extending multiple point trestle that is pivotably connected to said frame means with lower pivot means and an upper strut that normally prevents pivoting of the frame means relative to said trestle, said strut including two elongated arm parts that are pivoted to one another about a pivot axis at a junction, one of said arm parts being pivotably connected to said trestle and the other of said arm parts being pivotably connected to said frame means, an element normally fixing said arm parts in general longitudinal alignment to one another at said junction until overload, said element being an elongated multiple shearable pin that extends generally parallel to said strut through respective openings in said arm parts adjacent said junction, said pin extending in a direction transverse to said pivot axis.

2. An agricultural implement as claimed in claim 1, wherein advancing means on said strut urges said element into connection with the two parts to re-establish an operative position following overload.

3. An agricultural implement as claimed in claim 1, in which the longitudinal axes of the two arm parts are normally inclined to one another.

4. An agricultural implement as claimed in claim 3, in which the angle of inclination is about 5°.

5. An implement attachment as claimed in claim 1, in which said frame means is elongated and a transverse row of rotatable soil working members with tools are supported along the length of said frame means.

6. An agricultural implement as claimed in claim 1, wherein said junction is comprised by disc means on an upper arm part and fork means on a lower arm part, said disc means being joined to said fork means by a pivot, said shear pin extending through respective openings in said fork means and said disc means to prevent relative pivoting between said arm parts until overload.

7. An agricultural implement as claimed in claim 6, wherein said openings are defined by corresponding hardened sleeves that abut one another until overload, at least one of said sleeves being convex at its abutting surface.

8. An agricultural implement as claimed in claim 7, wherein said shear pin is a multiple shearable elongated element in a holder connected to one of said arm parts, spring means urging said element towards said openings.

9. An agricultural implement as claimed in claim 8, wherein the disc means is a disc having its opening at the outer periphery thereof, said opening receiving a shearable portion of said pin, means ejecting said portion from said opening following overload and relative pivoting between said two arm parts.

10. An agricultural implement as claimed in claim 9, wherein said pin and holder are secured to said lower arm part.

* * * * *